United States Patent
Frost

(10) Patent No.: US 10,241,591 B1
(45) Date of Patent: Mar. 26, 2019

(54) KEY PAD USER INTERFACE FOR NON-VERBAL, COMMUNICATION SYSTEM

(71) Applicant: L. Alford Frost, Mountain View, CA (US)

(72) Inventor: L. Alford Frost, Mountain View, CA (US)

( * ) Notice: Subject to any disclaimer, the term of this patent is extended or adjusted under 35 U.S.C. 154(b) by 0 days.

(21) Appl. No.: 15/448,458

(22) Filed: Mar. 2, 2017

Related U.S. Application Data

(60) Provisional application No. 62/302,712, filed on Mar. 2, 2016.

(51) Int. Cl.
*G06F 3/023* (2006.01)

(52) U.S. Cl.
CPC .......... *G06F 3/0238* (2013.01); *G06F 3/0233* (2013.01)

(58) Field of Classification Search
None
See application file for complete search history.

(56) References Cited

U.S. PATENT DOCUMENTS

| | | | | |
|---|---|---|---|---|
| 4,237,344 A | * | 12/1980 | Moore | H04M 11/027 340/286.07 |
| 9,235,979 B2 | * | 1/2016 | Schuman, Sr. | G08B 25/00 |

* cited by examiner

*Primary Examiner* — Duane N Taylor, Jr.
(74) *Attorney, Agent, or Firm* — Plager Schack LLP; Mark H. Plager; Alexis J. Saenz

(57) ABSTRACT

A system and keypad interface is disclosed that allows users to communicate with non-verbal cues. Embodiments include an optimal key pattern(s) to minimize human time using the control interface. Aspects of the system block the natural reading process and rely on pattern recognition, thus users can enter and respond to messages more quickly without the cognitive upset of reading messages that rely solely on left to right or vice versa. The grouping of the keys optimizes or minimizes the time a human uses the control system based on how the human brain interprets visual information.

8 Claims, 6 Drawing Sheets

KEY PAD USER INTERFACE FOR NON-VERBAL, COMMUNICATION SYSTEM

CROSS REFERENCE TO RELATED APPLICATIONS

This application claims benefit under 35 U.S.C. § 119(e) of U.S. Provisional Application having Ser. No. 62/302,712 filed Mar. 2, 2016, which is hereby incorporated by reference herein in its entirety.

BACKGROUND

The embodiments herein relate generally to a system for non-verbal communication optimized to minimize user time and maximize understanding of messages by placement and arrangement of buttons.

Managing processes in real-time requires process control inputs that occur timely. Control of human-based processes requires inputs and outputs to other humans and must augment how the brain recognizes and interprets communication. In many professional office settings, communication between the professional and any assistants is critical in many situations. Conventional communication is performed by written messages from one party to the other. However, reading is a very slow brain function, therefore any user interface that requires the eye to "read scan" left to right becomes very slow in comparison. There is a challenge to achieve balance between message content importance and the overhead to receive and interpret the message. Also reading is a cognitive function that suspends other cognitive functions required by the human user to complete a task performed in parallel. Some prior art systems likewise use keypad implementations that force the user to read left to right and top down just as a text message. They require a lot of time to enter and interpret each message and therefore waste $1000's of dollars monthly.

Embodiments of the present invention provide a system that solves the time lag in communicating between parties.

SUMMARY

In one aspect, a system comprises a plurality of keypad interface panels. Each panel includes a plurality of grouped sets of keys. Each grouped set of keys are arranged in a vertical grouping as defined by a common function. The plurality of grouped sets of keys may be arranged from left to right relative to each other. Each grouped set of keys represent a different person and/or different function within an office setting so that when a selected key within each grouped set of keys is pressed, represents a visual and non-verbal form of communication between the plurality of keypad interface panels. One or more communication cables connect the plurality of keypad interface panels together. A central switchbox controller controls the receipt and transmission of signals between the plurality of keypad interface panels through the one or more communication cables.

In another aspect, a computer program product for non-verbal communication between separate locations is disclosed. The computer program product comprises a non-transitory computer readable storage medium having computer readable program code embodied therewith. The computer readable program code is configured to: display on a plurality of computing devices, copies of a digital keypad panel including a plurality of grouped sets of digital keys, each grouped set of digital keys arranged in a vertical grouping as defined by a common function, and the plurality of grouped sets of digital keys arranged from left to right relative to each other, wherein each grouped set of digital keys represent a different person and/or different function within an office setting; connect the plurality of computing devices through a common communication line; and in response to a plurality of user selected keys being pressed on one of the plurality of computing devices, lighting up the same plurality of keys on at least one other copy of the digital keypad panel on another computing device within the plurality of computing devices, wherein the user selected keys pressed represents a visual and non-verbal form of communication between the copies of the digital keypad panel.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Broadly, embodiments of the subject technology provide a system and keypad interface that allows a user to communicate messages to other parties in the system with non-verbal cues. In professional offices treating patients, visual and non-verbal cues may be necessary to provide quick communication between parties that are in separate locations (for example, different rooms). Some situations, for example, dentistry or other medical environments often have patients in temporary positions of discomfort or are in need of critical attention where seconds matter and there is little time to pick up a phone and discuss what is needed. Visual and non-verbal control occurs optimally when control messages are patterns of lighted keys. Embodiments herein describe an optimal key pattern(s) to minimize human time using the control interface. Aspects of the system block the natural reading process and rely on pattern recognition, thus users can enter and respond to messages more quickly without the cognitive upset of prior art approaches. The grouping of the keys optimizes or minimizes the time a human uses the control system based on how the human brain interprets visual information.

Figure 1:
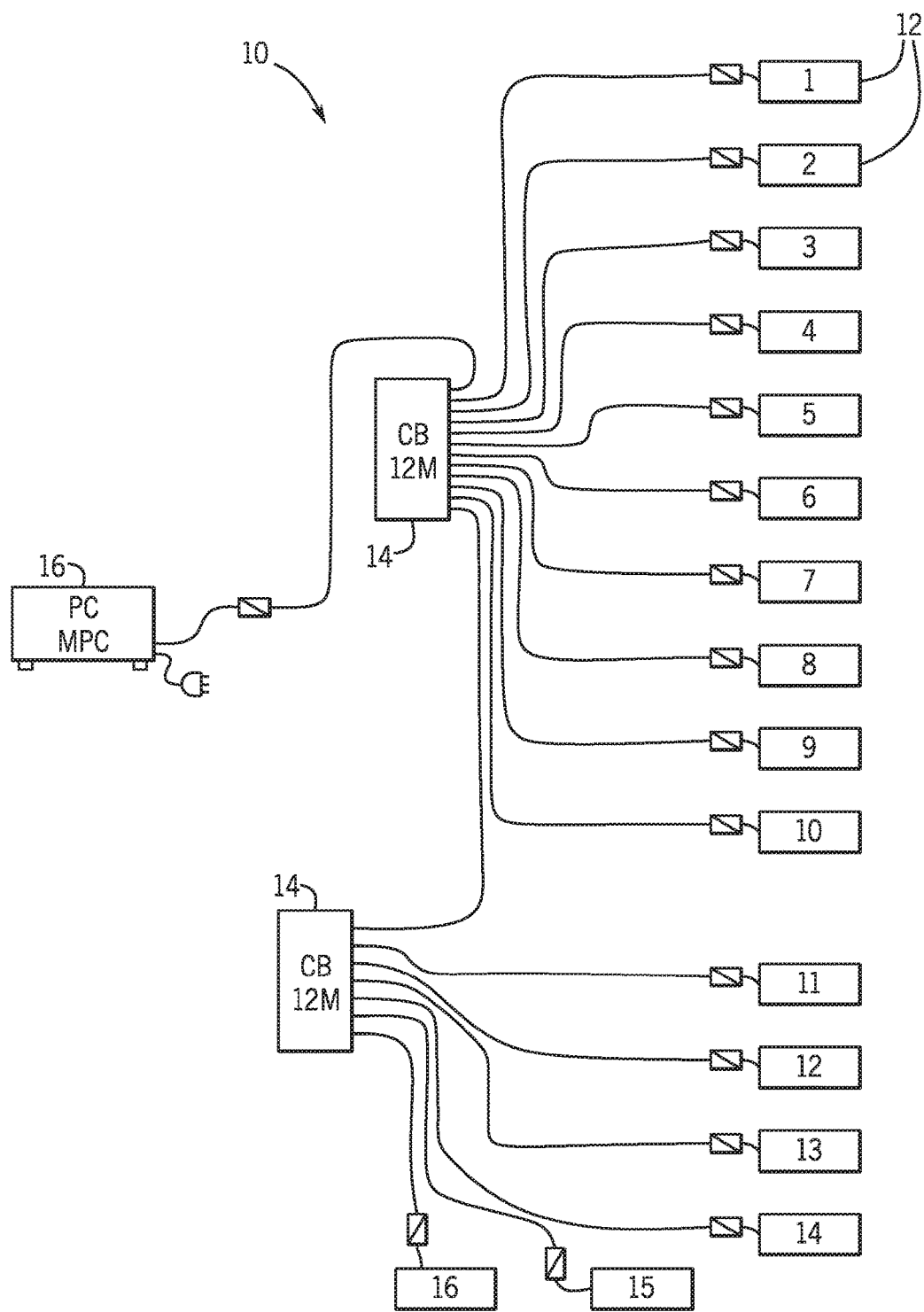
FIG. 1 is a schematic view of a system for non-verbal communication according to embodiments of the subject technology.

Referring now to FIG. 1, an exemplary embodiment of a system 10 includes a plurality of keypad interface panels 12 (referred to generally as "panels 12") connected in communication to one another. In the exemplary embodiment shown, the panels 12 are hard wired. While not shown in their actual physical position, it will be understood that each panel 12 may be in its own room while some embodiments may include more than one panel 12 to a room but each panel 12 is in a position that would be visually easily recognizable to personnel. The panels 12 may be connected to one or more switchboxes 14. If more than one switchbox 14 is included, then the switchboxes 14 may be mutually connected to a computing device or multiplexing device 16. While sixteen panels 12 are shown, it will be understood that any number of panels 12, two or more may be included in the system.

Figure 2:
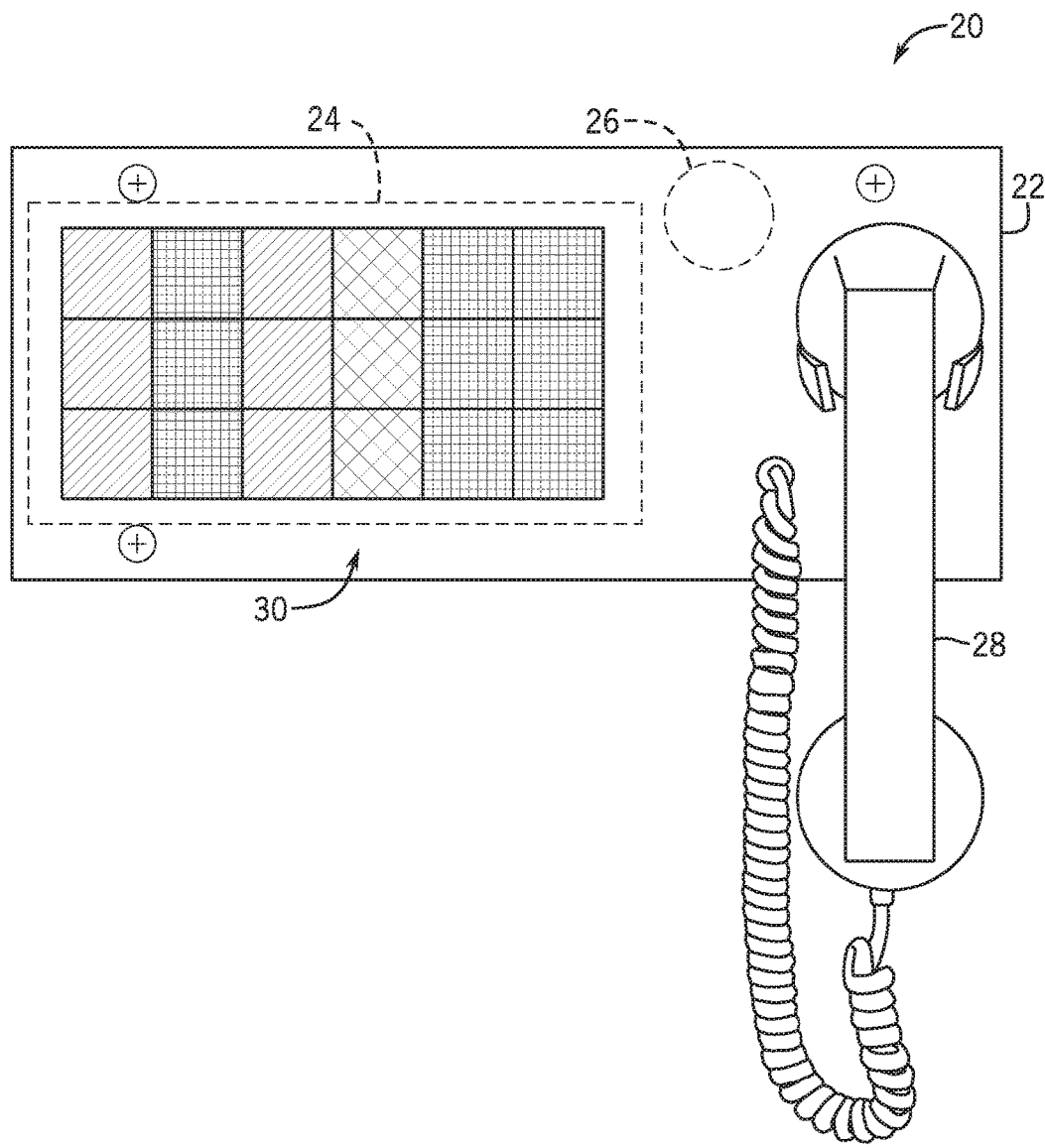
FIG. 2 is a front view of a user interface panel for the system of FIG. 1 according to an exemplary embodiment.
Figure 3:
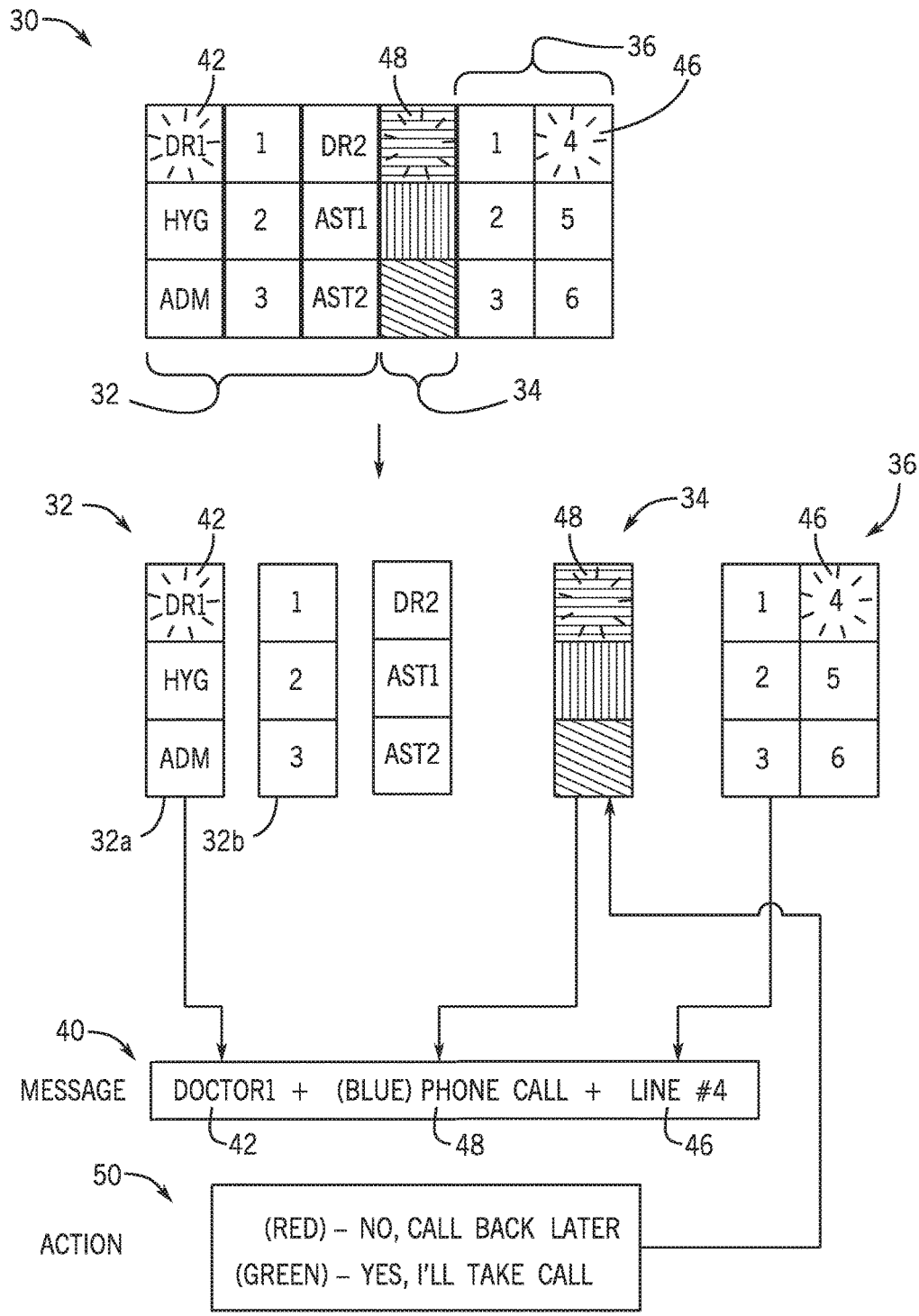
FIG. 3 shows front views of a keypad in unexploded and exploded views according to an exemplary embodiment.
Figure 4A:
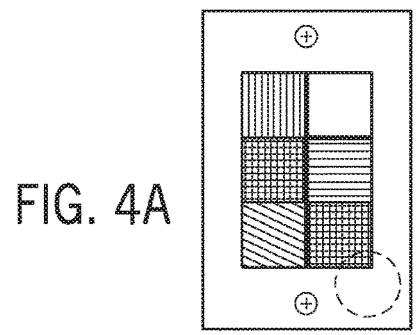
FIGS. 4A, 4B, 4C, 4D, and 4E are front views of keypad configurations according to alternative embodiments.
Figure 4B:
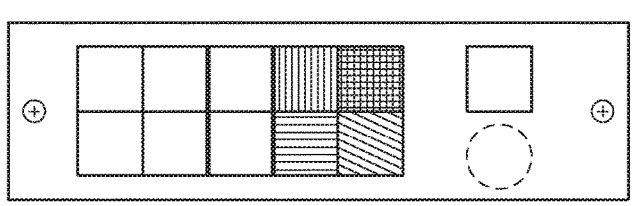
Figure 4C:
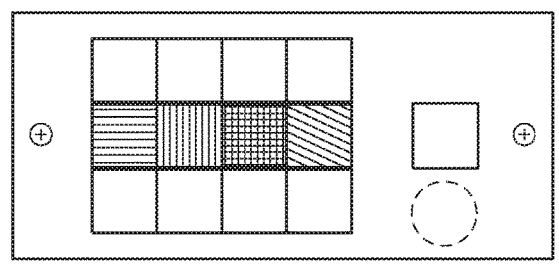
Figure 4D:
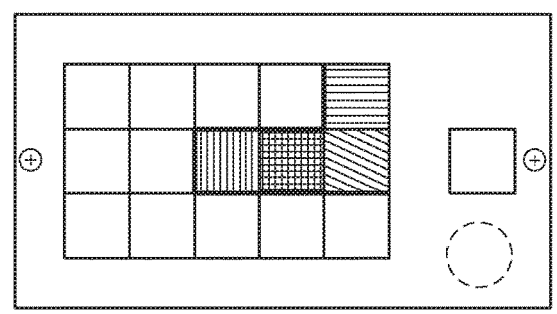
Figure 4E:
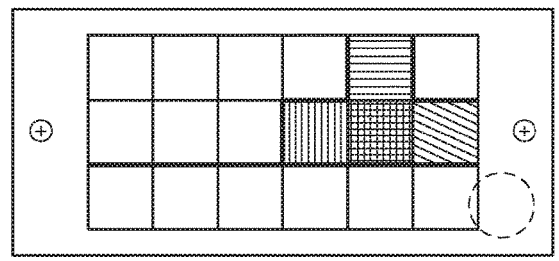

Referring now to FIGS. 2 and 3, a station 20 is shown according to an exemplary embodiment. The station 20 includes a keypad interface panel 22. Some embodiments include a phone handset 28 when a situation affords time for verbal communication. The panel 22 includes an array 30 of keys that when pressed, illuminate at the station 20 and illuminate corresponding or the same keys on other stations 20 that are connected to the present station 20. The array 30 may be supported by a circuit board 24 that is normally hidden by the panel 22 housing and whose outline is shown in dashed lines to represent that it is hidden from view. In some embodiments, keys may use alphanumeric indicia and/or color to represent the various parts of the message. Some embodiments may include an audible alert tone provided by speaker 26 upon the entry of a key based message.

In an exemplary embodiment, the array 30 of keys are arranged into vertical groups (32;34;36). The groups (32;34;36) represent different categories of functions or personnel as understood by users within the system. The keys within a respective group (32;34;36) are arranged vertically relative to each other key in the same group. Some key groups may be further divided into sub-groups. For example, group 32 may comprise key groups 32a and 32b. The group of keys 32a may represent a group of personnel individuals. The key 42 represents a first doctor in the facility. Other keys not called out but labeled may represent for example a hygienist, an administrative assistant, a second doctor, and two different assistants. The group of numbered keys 32b between the labeled personnel keys may represent in this example, the ability to designate one of the personnel labels with a pre-designated person (for example a first hygienist, a second hygienist, etc.). This adds flexibility to the system when defining who represents certain key presses. The group of keys 34 may represent actions to be taken by a personnel member. The group of keys 36 may represent numbered objects (for example, phone lines, rooms, etc.). The group of keys 48 may be colored to represent pre-defined actions. Colored keys as will be appreciated, play a role in visual interpretation by providing the user a quick recognition of an action associated with the color. More than one group of colored keys may be present to represent more than one type of action within a message. As will also be appreciated, the placement of colored keys between the alphanumeric indicia helps one to discern between the groups representing people and/or locations as it is easier to separate cues related to people and places when interrupted by color. Thus a message string is easily interpreted when presented in the form of person-number-action represented by color- and follow-up text/number. As will be understood, other formats may be implemented depending on the application and needs of the customer user.

Keys 42, 46, and 48 are illustrated with radiating lines to represent keys that have been pressed and illuminated in an example of use. The groups (32;34;36) may be positioned left to right or left and right of each other to provide an easily identifiable sequence of actions that can be visually interpreted from illuminated keys. In the example shown, the table 40 provides an interpretation of the pressed key sequence. The key sequence indicates that an alert is being sent to Doctor1 (represented by key 42) that a phone call (represented by blue colored key 48) is waiting his answer on line number 4 (as represented by key 46. The doctor may respond by pressing one of the other keys in group 34 which indicates whether he or she will take the call or call back later (see table 50). As will be appreciated, the eye/brain processing for reading is blocked by the vertical disposition of the key groups (32;34;36) leading to significantly less time to input and interpret the message. Instead of users needing to find another person, enter another room, and discuss what needs to be performed (which may take minutes), users in a facility are able to interpret the non-verbal message provided by aspects of the system disclosed in a matter of a second if not less than a second. Testing shows the subject technology disclosed herein allows users to communicate 10-20 times faster than some other prior art approaches. For example, in comparison to systems which rely primarily on horizontally grouped keys, the horizontal key group approach suffer from 3-5 times more time required to process a non-verbal communication than the vertically grouped keys in the interface panels 22 disclosed. The disclosed system is indiscriminate in terms of who sees the message. The message is so concise that every staff member will only need to look at the panel for a brief moment and the targeted staff member will be able to respond using reaction to the displayed key sequence alone. As will be appreciated, over the course of a busy working day, the aggregate time savings provided by the subject technology saves an office a lot in time spent communicating which can translate into more patients being attended.

FIGS. 4A, 4B, 4C, 4D, and 4E show keypad panels 60, 70, 80, 90, and 100 respectively which include alternate key grouping embodiments. While an exemplary embodiment is proposed using primarily vertical key group arrangements, some embodiments may still yet benefit from the subject technology by varying the positions of keys in groups as shown.

Figure 5:
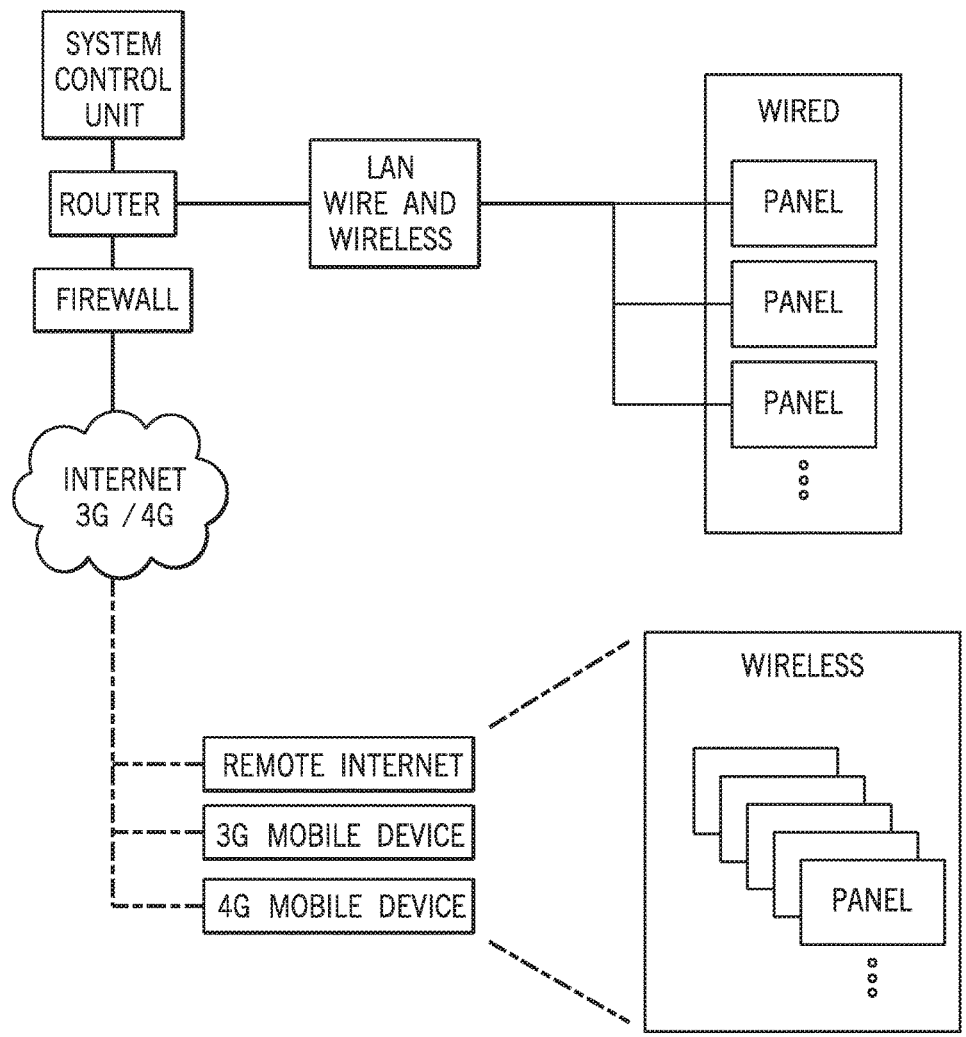
FIG. 5 is a block diagram of a communication network for a system of non-verbal communication integrating wired and wirelessly connected panels according to an exemplary embodiment.

Referring now to FIG. 5, elements of the system may be positioned in multiple rooms (or in embodiments using software on a computing device, may sometimes be in the same room visible to parties in the room). One or more rooms in for example the office setting may have its own keypad interface. Elements of the system are readily adaptable or installation without the need to radically retrofit existing walls as shown. The multiple keypad interfaces may be connected via hardwire. Thus some embodiments may include a mix of hardwired panels connected with wireless panels. (and in some embodiments it is contemplated using a wireless network). In some embodiments, the multiple lines are coupled to a master controller (labeled "system control unit") which may be for example a computer or other processor based switchbox to control which messages are sent/received by which rooms and to control the content of the messages by lighting up the correct keys on receiving keypad interfaces. An example connection scheme along with an exemplary installation process is shown. Some embodiments may use a software application interfaced through a computing device (described more fully below). The master controller may receive wireless signals through cellular telephony or Internet connection, which are integrated into any other wirelessly connected device or hard-wired device accordingly.

Figure 6:
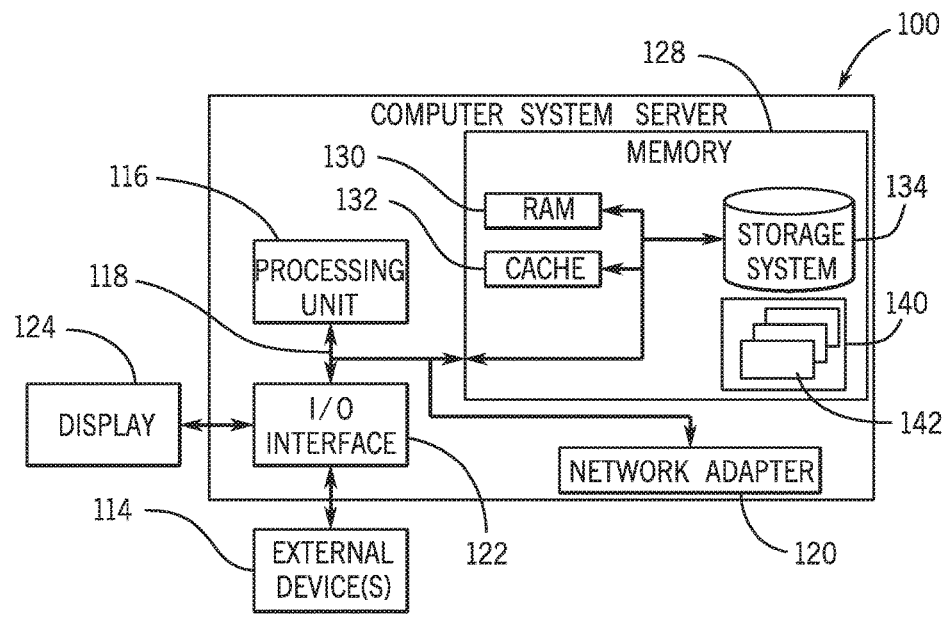
FIG. 6 is a block diagram of a computing device according to an exemplary embodiment.

Referring now to FIG. 6, a schematic of an example of a computer system/server 100 (sometimes referred to above as a computing device) is shown. The computer system/server 100 may serve the role as the machine implementing for example the functions of storing functions or persons associated with a key, coordinating the communication of messages between panels, hosting a software application embodiment, and routing messages through the Internet and/or cellular telephony networks between panels and computing devices. The components of the computer system/server 100 may include, but are not limited to, one or more processors or processing units 116, a system memory 128, and a bus 118 that couples various system components including the system memory 128 to the processor 116.

The computer system/server 100 may perform functions as different machine types depending on the role in the system the function is related to. For example, the computer system/server 100 may be personal computer systems, tablet devices, mobile telephone devices, wearable smart devices, handheld or laptop devices, set top boxes, programmable consumer electronics when interfaced directly by users through a software application embodiment. In the role of a host for software applications, the computer system/server 100 may be server computer systems, multiprocessor systems, microprocessor-based systems, network PCs, and distributed cloud computing environments that include any of the above systems or devices, and the like. The computer system/server 100 may be described in the general context of computer system executable instructions, such as program modules, being executed by a computer system (described for example, below). In some embodiments, the computer system/server 100 may be a cloud computing node connected to a cloud computing network (not shown). The computer system/server 100 may be practiced in distributed cloud computing environments where tasks are performed by remote processing devices that are linked through a communications network. In a distributed cloud computing environment, program modules may be located in both local and remote computer system storage media including memory storage devices.

The computer system/server 100 may typically include a variety of computer system readable media. Such media could be chosen from any available media that is accessible by the computer system/server 100, including non-transitory, volatile and non-volatile media, removable and non-removable media. The system memory 128 could include one or more computer system readable media in the form of volatile memory, such as a random access memory (RAM) 130 and/or a cache memory 132. By way of example only, a storage system 134 can be provided for reading from and writing to a non-removable, non-volatile magnetic media device. The system memory 128 may include at least one program product 140 having a set (e.g., at least one) of program modules 142 that are configured to carry out the functions of embodiments of the invention. The program product/utility 140, having a set (at least one) of program modules 142, may be stored in the system memory 128 by way of example, and not limitation, as well as an operating system, one or more application programs, other program modules, and program data. Each of the operating system, one or more application programs, other program modules, and program data or some combination thereof, may include an implementation of a networking environment. The program modules 142 generally carry out the functions and/or methodologies of embodiments of the invention as described herein.

The computer system/server 100 may also communicate with one or more external devices 114 such as a keyboard, a pointing device, a display 124, etc.; and/or any devices (e.g., network card, modem, etc.) that enable the computer system/server 100 to communicate with other computing devices. Such communication can occur via Input/Output (I/O) interfaces 122. Alternatively, the computer system/server 100 can communicate with one or more networks such as a local area network (LAN), a general wide area network (WAN), and/or a public network (e.g., the Internet) via a network adapter 120. As depicted, the network adapter 120 may communicate with the other components of the computer system/server 100 via the bus 118.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 140) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 116 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 7:
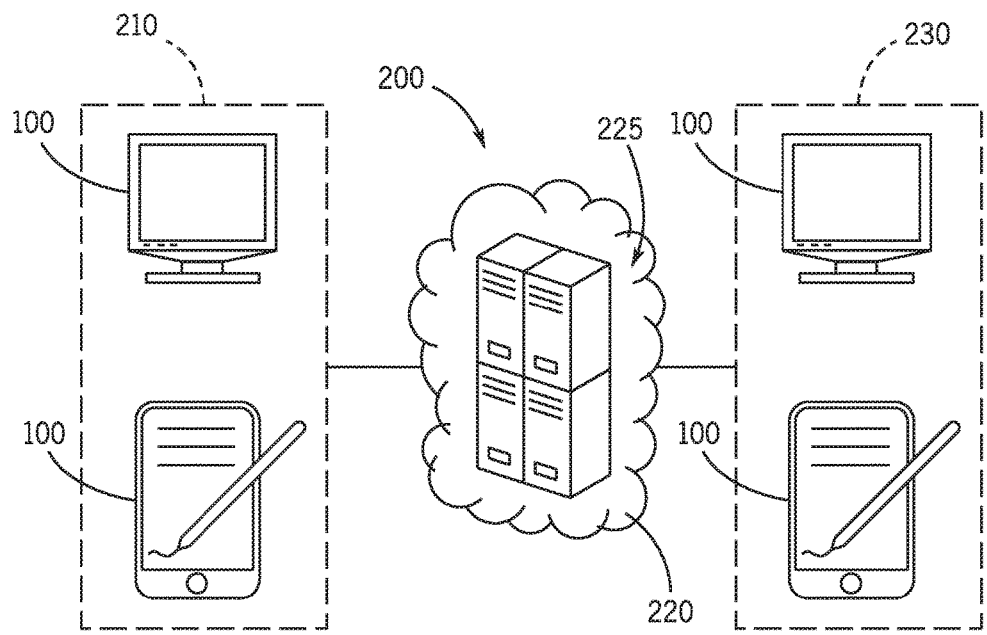
FIG. 7 is a block diagram of a network according to an exemplary embodiment.

Referring now to FIG. 7, a block diagram of a system 200 for providing non-verbal communication between keypad interface panels is shown. The system 200 may connect a first end user 210 to a second end user 230 through the network 220. The first and second end users 210 and 230 may be personnel in the same facility as described above. The network 220 may include a server 225 storing a software embodiment of the disclosed invention. The end user 210 and end user 230 may interact with the system 200 through respective interface panels which may be in either one case or both a computing device 100 as described above. Likewise, the server 225 may function for example, under the description the computer system/server 100 of FIG. 7. In some embodiments, the network 220 may be a cloud based environment and communication from one interface panel to another may occur through the cloud.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above. For example, the user interface panel described in FIGS. 2 and 3 is not necessarily a preferred embodiment and is merely an example of one customized station. Other stations may be customized based on customer needs and may include labels of different meanings pre-defined to represent personnel of various amounts of each (for example, secretaries 1-5), different actions and more than one category of actions (for example, one category for actions related to retrieving items such as files, tools, etc. and one category for actions designating what to be done with the retrieved item (for example, bring to a person, dispose of the item, refresh a supply, etc.). Thus, depending on the numbers of people, actions, and locations a user wants in their system, several permutations can be designed to fit the needs of the customer.

What is claimed is:

1. A system, comprising:
a plurality of keypad interface panels, each panel including,
a plurality of grouped sets of touch-enabled keys, each set of keys in a group is arranged in a vertical grouping as defined by a common function, wherein
a first group of keys is designated to represent pre-set persons within an office setting,
a second group of keys is designated to represent a predesignated action within the office setting,
a third group of keys is designated to represent a location in the office setting,
and wherein
when a first selected key within the first group of keys, a second selected key within the second group of keys, and a third selected key within the third group of keys are pressed, represents a visual and non-verbal form of communication between the plurality of keypad interface panels identifying a selected person, a selected action for the selected person, and a selected location for the selected person to perform the selected action;
one or more communication cables connecting the plurality of keypad interface panels; and
a central switchbox controller configured to control the receipt and transmission of signals between the plurality of keypad interface panels through the one or more communication cables.

2. The system of claim 1, wherein in response to a plurality of selected keys being pressed on one of the plurality of keypad interface panels by a first user, lighting up the same keys on at least one other of the plurality of keypad interface panels.

3. The system of claim 2, wherein the plurality of selected keys pressed represent a sequence of pre-defined non-verbal cues to a recipient user at the at least one other of the plurality of keypad interface panels.

4. The system of claim 1, further comprising a mobile computing device including a software application configured to display a digital keypad interface panel with digital keys arranged according to said plurality of grouped sets of keys, wherein the software application communicates wirelessly with the central switchbox and the plurality of keypad interface panels.

5. The system of claim 1, wherein each key within a selected grouped set of keys includes indicia or a color code representing the selected person, the selected action, and the selected function within the office setting.

6. A computer program product for non-verbal communication between separate locations, the computer program product comprising a non-transitory computer readable storage medium having computer readable program code embodied therewith, the computer readable program code being configured to:
display on a plurality of computing devices, copies of a digital keypad panel including:
a plurality of grouped sets of touch-enabled keys, each set of keys in a group is arranged in a vertical grouping as defined by a common function, wherein
a first group of keys is designated to represent pre-set persons within an office setting,
a second group of keys is designated to represent a predesignated action within the office setting,
a third group of keys is designated to represent a location in the office setting, and wherein
when a first selected key within the first group of keys, a second selected key within the second group of keys, and a third selected key within the third group of keys are pressed, represents a message identifying a selected person, a selected action for the selected person, and a selected location for the selected person to perform the selected action;
connect the plurality of computing devices through a common communication line;
in response to the first selected key, the second selected key, and the third selected key being pressed on one of the plurality of computing devices, lighting up copies of corresponding first, second, and third selected keys on at least one other copy of the digital keypad panel on another computing device within the plurality of computing devices, wherein the first, second, and third selected keys pressed represent a visual and non-verbal form of communication between the copies of the digital keypad panel.

7. The computer program product of claim 6, wherein the first, second, and third selected keys pressed represent a sequence of pre-defined non-verbal cues to a recipient user at the at least one other copy of the digital keypad panel.

8. The computer program product of claim 7, wherein each digital key includes indicia or a color code representing the selected person, the selected action, and the selected function within the office setting.

* * * * *